United States Patent
Gaiser

(10) Patent No.: US 9,982,570 B2
(45) Date of Patent: May 29, 2018

(54) STACKED PLATE EVAPORATOR

(75) Inventor: Gerd Gaiser, Reutlingen (DE)

(73) Assignee: EBERSPÄCHER EXHAUST TECHNOLOGY GMBH & CO. KG, Neunkirchen (DE)

( * ) Notice: Subject to any disclaimer, the term of this patent is extended or adjusted under 35 U.S.C. 154(b) by 557 days.

(21) Appl. No.: 14/410,838

(22) PCT Filed: Jun. 26, 2012

(86) PCT No.: PCT/EP2012/062389
§ 371 (c)(1),
(2), (4) Date: Jun. 2, 2015

(87) PCT Pub. No.: WO2014/000775
PCT Pub. Date: Jan. 3, 2014

(65) Prior Publication Data
US 2015/0308295 A1   Oct. 29, 2015

(51) Int. Cl.
*F28D 7/02* (2006.01)
*F02M 31/08* (2006.01)
(Continued)

(52) U.S. Cl.
CPC ............ *F01K 23/065* (2013.01); *F01K 23/10* (2013.01); *F02G 5/02* (2013.01); *F22B 1/1807* (2013.01);
(Continued)

(58) Field of Classification Search
CPC ...... F02G 5/02; F28D 9/0031; F28D 21/0003; F28F 3/12; F28F 13/08
(Continued)

(56) References Cited

U.S. PATENT DOCUMENTS 1,622,376 A * 3/1927 Davenport ............ F25B 39/024
165/147
3,161,234 A * 12/1964 Rannenberg .......... F25B 39/022
165/147
(Continued)

FOREIGN PATENT DOCUMENTS

DE           269 204 A1    6/1989
DE    10 2008 058210 A1    5/2010
(Continued)

OTHER PUBLICATIONS

Japanese Office Action dated Jan. 5, 2016.

*Primary Examiner* — Ljiljana Ciric
(74) *Attorney, Agent, or Firm* — McGlew and Tuttle, P.C.

(57) ABSTRACT

An evaporator (1), for evaporating a liquid (4), particularly for a waste heat utilization device of an internal combustion engine, includes a plurality of channel plate arrangements (2) that are stacked in a stacking direction (3). A gas path (6) is formed between each pair of adjacent channel plate arrangements (2), through which a gas (7) can be conducted. The gas is used to supply the heat that is required to evaporate the liquid (4). Each channel plate arrangement (2) contains a liquid inlet (8), a steam outlet (9), and a channel (11) which connects the liquid inlet (8) and steam outlet (9) together and which forms a repeatedly deflecting evaporation path (12) for the liquid (4) to be evaporated. The channel (11) has, in an evaporation path (12) evaporation zone (14), a flowable cross-section (18) which increases in a direction of liquid (4) flow.

20 Claims, 10 Drawing Sheets

(51) Int. Cl.
*F01K 23/06* (2006.01)
*F28F 3/12* (2006.01)
*F28F 13/08* (2006.01)
*F28D 9/00* (2006.01)
*F01K 23/10* (2006.01)
*F02G 5/02* (2006.01)
*F22B 1/18* (2006.01)
*F28D 21/00* (2006.01)

(52) U.S. Cl.
CPC ....... *F28D 9/0031* (2013.01); *F28D 21/0003* (2013.01); *F28F 3/12* (2013.01); *F28F 13/08* (2013.01); *F28D 2021/0064* (2013.01)

(58) Field of Classification Search
USPC .................................................. 165/146, 147
See application file for complete search history.

(56) References Cited

U.S. PATENT DOCUMENTS

| | | | | |
|---|---|---|---|---|
| 3,208,234 | A * | 9/1965 | Messinger | B64D 13/06 165/104.31 |
| 3,877,517 | A * | 4/1975 | Pasternak | F28D 7/08 165/146 |
| 5,099,913 | A * | 3/1992 | Kadle | B60H 1/3227 165/147 |
| 5,174,370 | A * | 12/1992 | Hallgren | B01D 1/221 165/147 |
| 5,359,989 | A | 11/1994 | Chase et al. | |
| 5,709,264 | A * | 1/1998 | Sweeney | B01D 1/221 165/115 |
| 5,875,838 | A * | 3/1999 | Haselden | F28D 9/0043 165/146 |
| 6,286,588 | B1 * | 9/2001 | Uehara | F28D 9/00 165/146 |
| 6,286,589 | B1 * | 9/2001 | Uehara | F28B 1/00 165/146 |
| 6,948,559 | B2 * | 9/2005 | Reinke | F28D 9/005 165/140 |
| 7,980,295 | B2 * | 7/2011 | Takamatsu | F28D 15/043 165/104.26 |
| 8,438,864 | B2 * | 5/2013 | Roetker | F24H 4/04 165/146 |
| 2002/0014326 | A1 * | 2/2002 | Nakado | F28D 1/0341 165/153 |
| 2004/0159424 | A1 | 8/2004 | Reinke et al. | |
| 2005/0056396 | A1 * | 3/2005 | Shinohara | F01N 3/043 165/41 |
| 2007/0056719 | A1 * | 3/2007 | Katoh | F28D 1/0333 165/146 |
| 2008/0011462 | A1 * | 1/2008 | Tasaki | F28F 13/08 165/147 |
| 2010/0084120 | A1 * | 4/2010 | Yin | F22B 27/00 165/146 |
| 2013/0219880 | A1 | 8/2013 | Irmler | |

FOREIGN PATENT DOCUMENTS

| | | |
|---|---|---|
| DE | 10 2009 012493 A1 | 9/2010 |
| DE | 10 2009 045671 A1 | 4/2011 |
| DE | 10 2011 077154 A1 | 11/2012 |
| EP | 0408751 A1 | 1/1991 |
| JP | S56-042090 A | 4/1981 |
| JP | H03-504761 A | 10/1991 |
| WO | 2012/045845 A1 | 4/2012 |

* cited by examiner

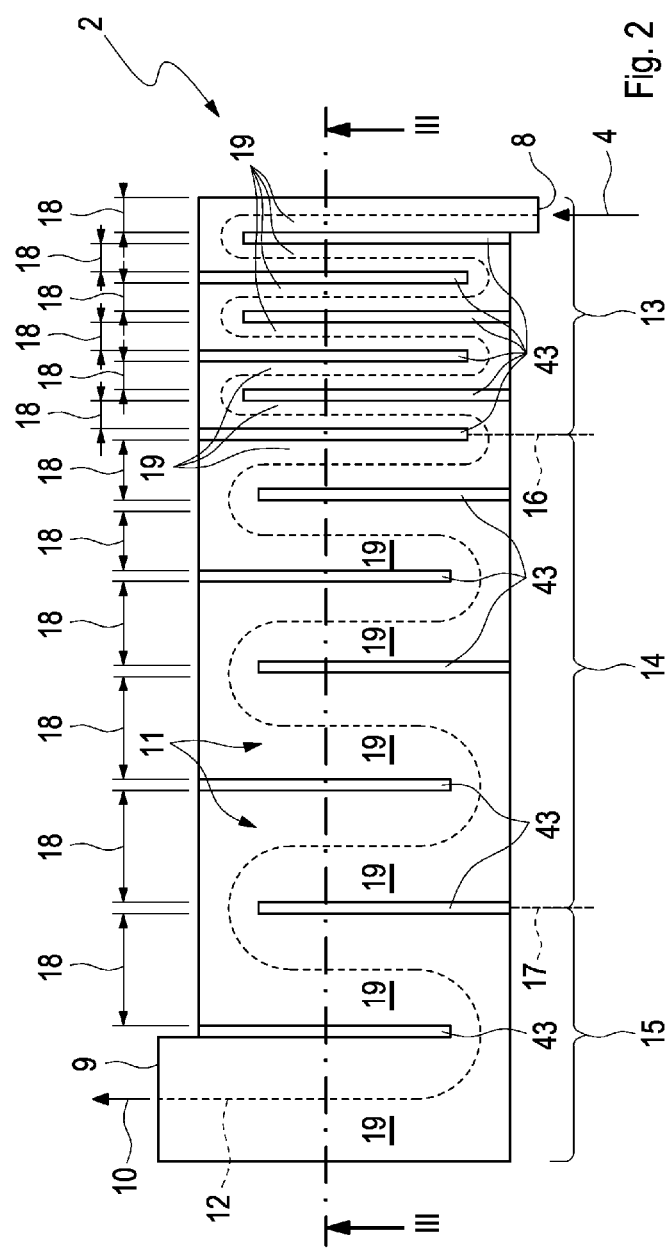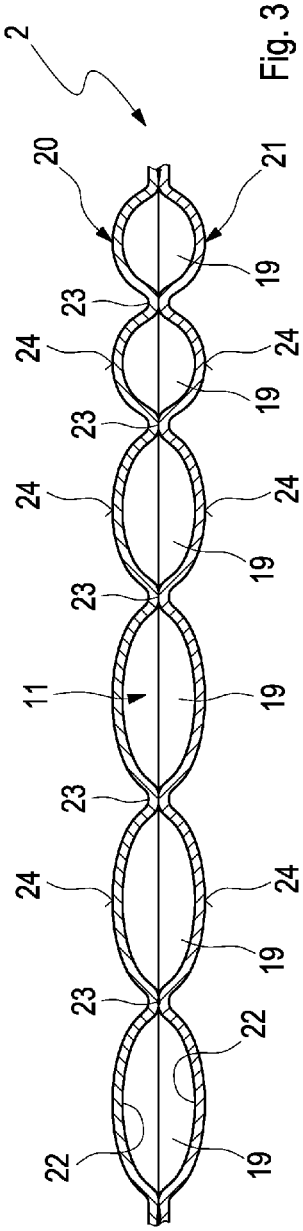

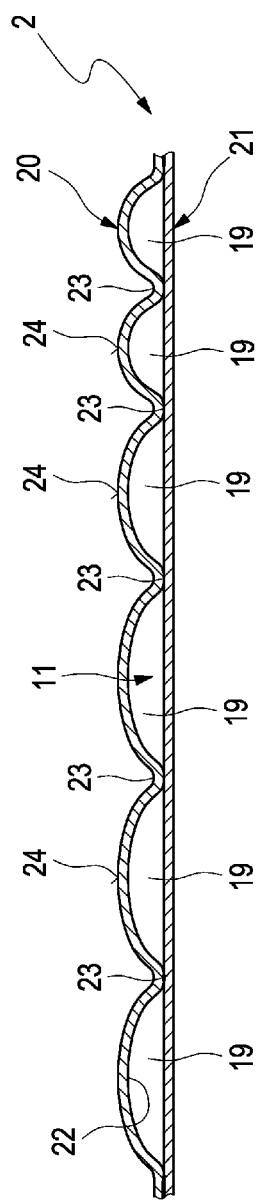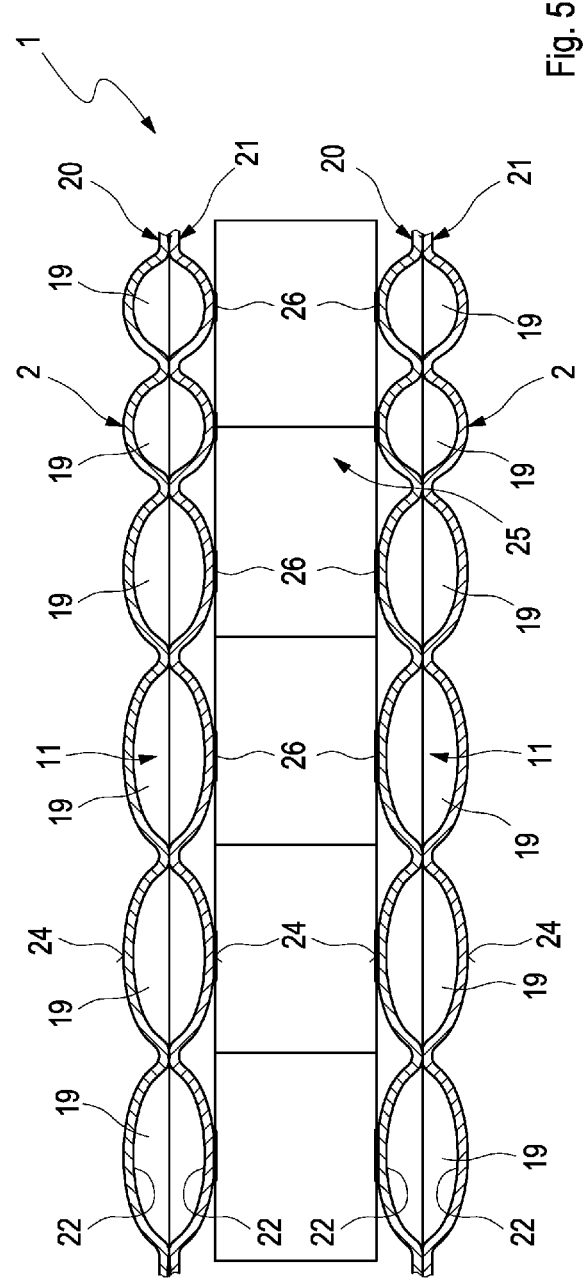

STACKED PLATE EVAPORATOR

CROSS REFERENCE TO RELATED APPLICATIONS

This application is a United States National Phase Application of International Application PCT/EP2012/062389 filed Jun. 26, 2012, the entire contents of which are incorporated herein by reference.

FIELD OF THE INVENTION

The present invention relates to an evaporator for evaporating a liquid and to a waste heat utilization device for an internal combustion engine.

BACKGROUND OF THE INVENTION

In waste heat utilization devices, which are based on the principle of a Rankine cycle process or a Rankine-Clausius cycle process, evaporators are employed with the help of which the working medium of the cycle process can be evaporated, for the purpose of which the heat required for that is extracted from the exhaust gas of an internal combustion engine. Accordingly, such an evaporator on the one hand comprises a gas path for the exhaust gas and on the other hand an evaporation path for the working medium to be evaporated.

Such an evaporator can be configured for example as a plate heat exchanger and accordingly comprise multiple channel plate arrangements, which are stacked in a stacking direction, wherein in each case between two adjacent plate arrangements a gas path is formed, through which a gas can be conducted, via which the heat required for evaporating the liquid can be supplied. The respective channel plate arrangement in this case can practically contain a liquid inlet, a vapor outlet and a channel connecting the liquid inlet to the vapor outlet, which channel for example forms a repeatedly diverted evaporation path for the liquid to be evaporated.

SUMMARY OF THE INVENTION

The present invention deals with the problem of stating an improved or at least another embodiment for an evaporator of the type mentioned at the outset, which is characterized by high efficiency and cost-effective producability.

The invention is based on the general idea of designing the respective channel, in which the evaporation of the liquid takes place, at least in one evaporation zone of the evaporation path so that the cross section through which a flow can flow increases in the flow direction of the liquid to be evaporated. The cross section through which a flow can flow of the evaporation path which increases in the flow direction takes into account to a certain degree the increase in volume of the liquid to be evaporated through the evaporation. Because of this, an excessive pressure increase in the evaporation path for example can be avoided. Furthermore, the flow velocity in the gas phase can also be reduced, which increases the dwell time of the liquid to be evaporated in the evaporator. Altogether, the efficiency of the evaporator can be increased because of this.

In conjunction with the plate design of the evaporator, the evaporator can be realized comparatively cost-effectively. The individual channel plate arrangements can be realized identical in design which reduces the production costs.

The increase of the cross section of the evaporation path through which a flow can flow in this case can be effected without steps or gradually within the evaporation zone in the flow direction of the liquid to be evaporated, for example linearly or progressively. It is likewise possible to realize the cross-sectional increase in steps.

The evaporation zone of the evaporation path substantially extends from a region of the evaporation path, in which evaporation commences, as far as to a region of the evaporation path, in which the liquid is substantially evaporated completely.

According to an advantageous embodiment, the respective channel can comprise in a pre-heating zone a cross section through which a flow can flow which remains constant in the flow direction of the liquid. Here it is taken into account that no significant change in volume materializes in the pre-heating zone. The pre-heating zone substantially extends from the liquid inlet as far as to a region of the evaporation path, in which evaporation commences.

Additionally or alternatively it can be provided that the respective channel in a superheating zone comprises a cross section through which a flow can flow which remains constant in the flow direction of the liquid. This is based on the consideration that in the superheating zone primarily a pressure increase in the vapor is to be achieved. The superheating zone in this case substantially extends from a region of the evaporation path, in which the liquid is substantially evaporated completely, as far as to the vapor outlet.

If both in the preheating zone as well as in the superheating zone cross sections through which a flow can flow which remain constant are present, this means that the evaporation path has a cross section through which a flow can flow which increases in the flow direction only, i.e. exclusively, in the evaporation zone. This means, furthermore, that the cross section through which a flow can flow is larger in the superheating zone than in the preheating zone.

In another embodiment, the respective channel can be formed through multiple channel sections arranged next to one another, wherein the evaporation path at the transition between two adjacent channel sections has a diversion of 180° each. Because of this, the channel or the evaporation path is given a meander-like course, which realizes a relatively great path length or channel length in a comparatively confined space.

In another embodiment, the respective channel plate arrangement can comprise two plates, wherein the respective channel is formed through stampings, which are either formed only in one of the two plates or formed mirror-symmetrically in both plates. The stampings for this purpose can be configured in particular according to the channel sections in order to realize the meander-like course for the channel or the evaporation path. The stampings can be realized for example through deep-drawing or through high-pressure forming. Provided that the stampings are only formed in one of the two plates, the other plate can be configured flat.

According to an advantageous further development, the respective plate provided with stampings can comprise on an outside facing the gas path convexly curved or flat contact surfaces in the region of the stampings. The curved contact surfaces can be produced in a particularly simple manner. The flat contact surfaces favor the through-flow in the gas path and can simplify the connection of elements improving the heat transfer.

According to a practical further development, a fin structure can be arranged in the respective gas path which is arranged on the contact surfaces, in particular fastened thereon. Such a fin structure can improve the heat transfer between the gas of the gas path and the respective plate, which improves the heat-transferring coupling between gas path and evaporation path. The fin structure can for example be soldered or welded to the respective plate in the region of the contact surfaces.

Particularly practically, the two plates of the respective channel plate arrangement can be fastened to one another. By doing so, the plate stack formed through the channel plate arrangements stacked on top of one another can be stabilized and in particular configured in a self-supporting manner. Practically, the two plates of the respective channel plate arrangement laterally enclosing the respective channel can be fastened to one another along the evaporation path. Because of this, the channels can be realized in a particularly simple manner. The fastening in this case can be realized for example by means of a soldering method or a welding method. Suitable welding methods are for example laser welding, microplasma welding, micro-TIG welding, roll seam welding and resistance welding.

In another advantageous embodiment, two lateral boundary walls can be provided which limit the gas paths on sides located opposite one another from a gas inlet as far as to a gas outlet. The boundary walls in this case can connect to one another or fasten to one another the adjacent channel plate arrangements. The boundary walls thus increase the stability of the plate stack. The one boundary wall can comprise inlet openings, which are each fluidically connected to a liquid inlet of one of the channel plate arrangements. Because of this, the supply of the liquid to be evaporated through the boundary wall is simplified. The other boundary wall can comprise outlet openings, which are each fluidically connected to a vapor outlet of one of the channel plate arrangements. Thus, a common discharge of the evaporated liquid through the other boundary wall can be simplified.

According to an advantageous further development, the boundary walls can each be formed through multiple wall elements, each of which laterally limit only one of the gas paths. Because of this, the modular construction of the evaporator is simplified, wherein in particular the number of the wall elements of the respective boundary wall largely corresponds to the number of the channel plate arrangements. Practically, the wall elements can each be attached either to both channel plate arrangements limiting this gas path or be integrally formed on one of the plates of one of the channel plate arrangements limiting this gas path and then be attached to the channel plate arrangement that is adjacent thereto. In particular, the integrated design, in which the respective wall element is integrally formed on at least one plate, simplifies a cost-effective production of the evaporator. Attaching the wall element is again practically effected via welded connections or soldered connections. By means of welded connections, multiple sheet seams can for example be realized, as a result of which multiple components can be fixed to one another simultaneously. Provided that the components to be fixed to one another lie flat against one another, soldered connections are preferred.

In another advantageous further development, an inlet covering can be attached to the one boundary wall, which covers multiple or all inlet openings and forms a supply channel, which fluidically connects a common liquid connection to the liquid inlets. Additionally or alternatively, an outlet covering can be attached to the other boundary wall, which covers multiple or all outlet openings and forms a discharge channel, which fluidically connects a common vapor connection to the vapor outlets. Through this measure, the assembly of the evaporator or the installation of the evaporator in the waste heat utilization device is simplified.

Practically, the stacked channel plate arrangements can form a stack which with respect to the stack direction has two end plates which are distant from one another, each of which form or limit a gas path with a channel plate arrangement that is adjacent thereto. The end plates thus do not contain an evaporation path but merely serve to limit the gas path. This design results in that all evaporation paths in the stack direction are arranged between two gas paths which increases the effectiveness of the evaporator.

According to an advantageous embodiment it can be provided that the respective channel plate arrangement is produced from iron or an iron alloy, in particular from steel, preferentially from stainless steel. Because of this, the respective channel plate arrangement has a particularly high temperature resistance, as a result of which it is possible in particular to arrange the evaporator relatively near the engine block of the internal combustion engine in the exhaust system, e.g. on or in the exhaust manifold. Alternatively it is also possible in principle to produce the channel plate arrangements from a light metal, e.g. from aluminum, or from a light metal alloy, preferentially from an aluminum alloy, as a result of which the evaporator has a particularly high energetic efficiency.

A waste heat utilization device according to the invention for an internal combustion engine, in particular in a motor vehicle, comprises a waste heat utilization circuit, in which a working medium circulates and in which in the flow direction of the working medium one after the other an expansion machine for expanding the working medium, a condenser for condensing the working medium, a conveying device for driving the working medium in the waste heat utilization circuit and an evaporator of the type described above for evaporating the working medium are arranged.

An internal combustion engine according to the invention, in particular for a motor vehicle, comprises a waste heat utilization device of the type described above and an exhaust system, which is coupled in a heat-transferring manner to the evaporator of the waste heat utilization device.

It is to be understood that the features mentioned above and still to be explained in the following cannot only be used in the respective combination stated but also in other combinations or by themselves without leaving the scope of the present invention.

Preferred exemplary embodiments of the invention are shown in the drawing and are explained in more detail in the following description, wherein same reference characters relate to same or similar or functionally same components.

The present invention shall be explained in more detail on the basis of the following figures and exemplary embodiments, without the present invention being limited to these. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 2 is a longitudinal section through a channel plate arrangement of evaporator corresponding to section lines II in FIG. 1;

FIG. 3 is another longitudinal section of the channel plate arrangement according to section lines III in FIG. 2, showing one of different embodiments;

FIG. 4 is another longitudinal section of the channel plate arrangement according to section lines III in FIG. 2, showing another of different embodiments;

FIG. 5 is a longitudinal section of the evaporator in the region of multiple channel plate arrangements;

DESCRIPTION OF THE PREFERRED EMBODIMENTS

Figure 1:
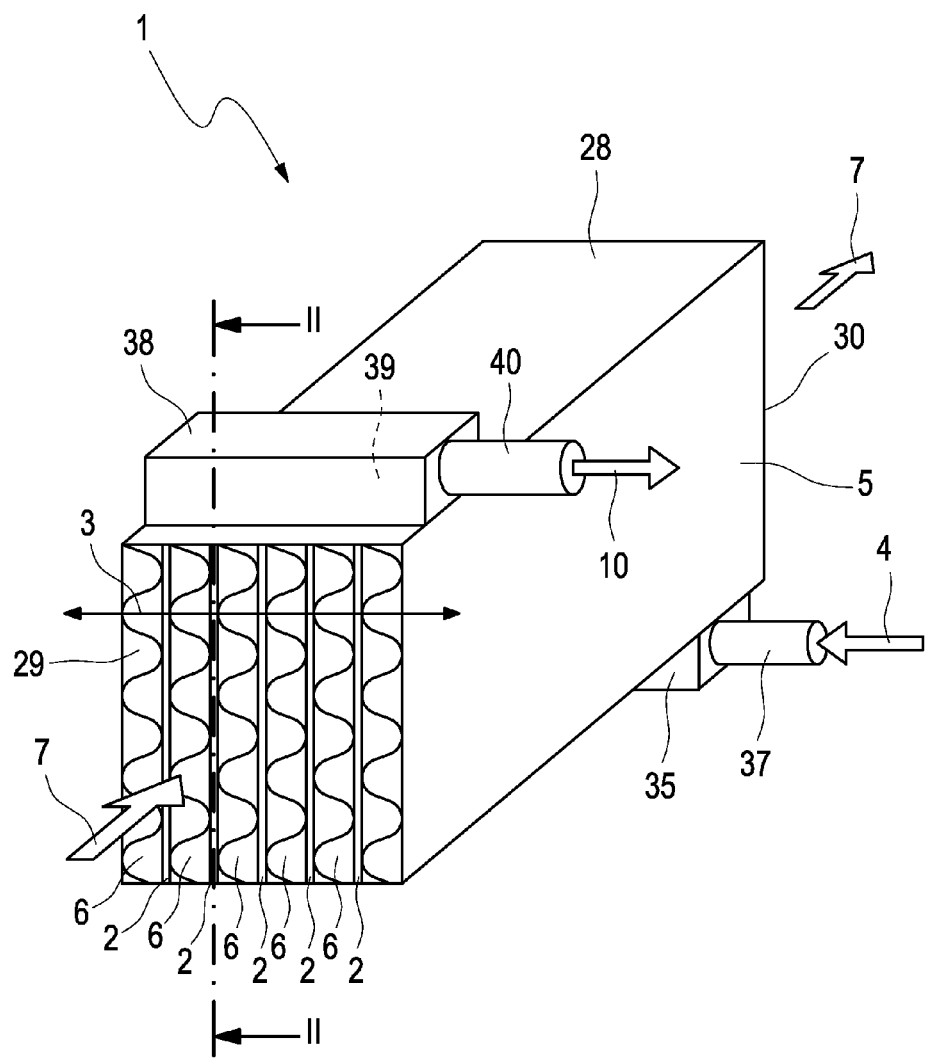
FIG. 1 is an isometric view of an evaporator.
Figure 6:
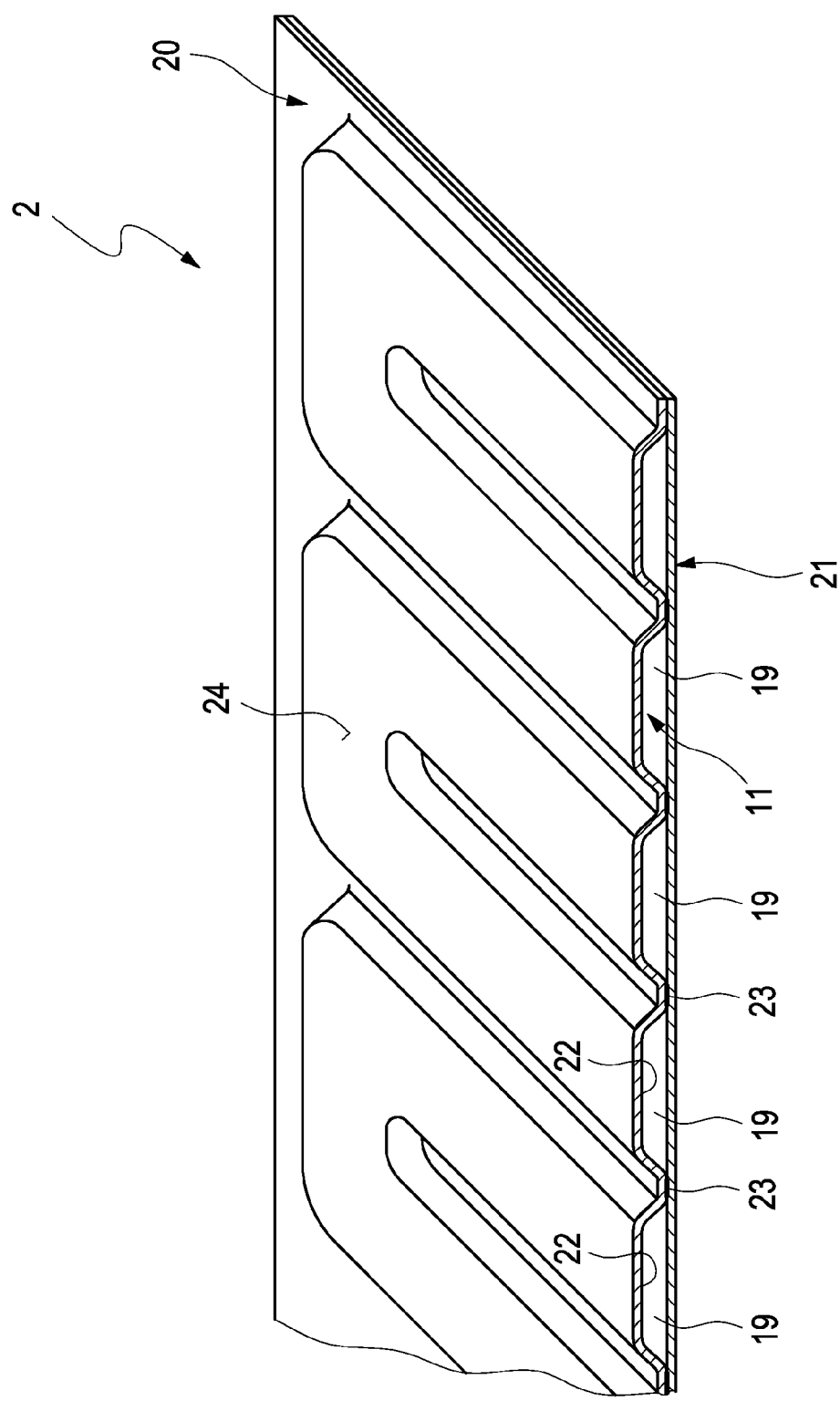
FIG. 6 is a partly sectioned isometric view of a channel plate arrangement.
Figure 7:
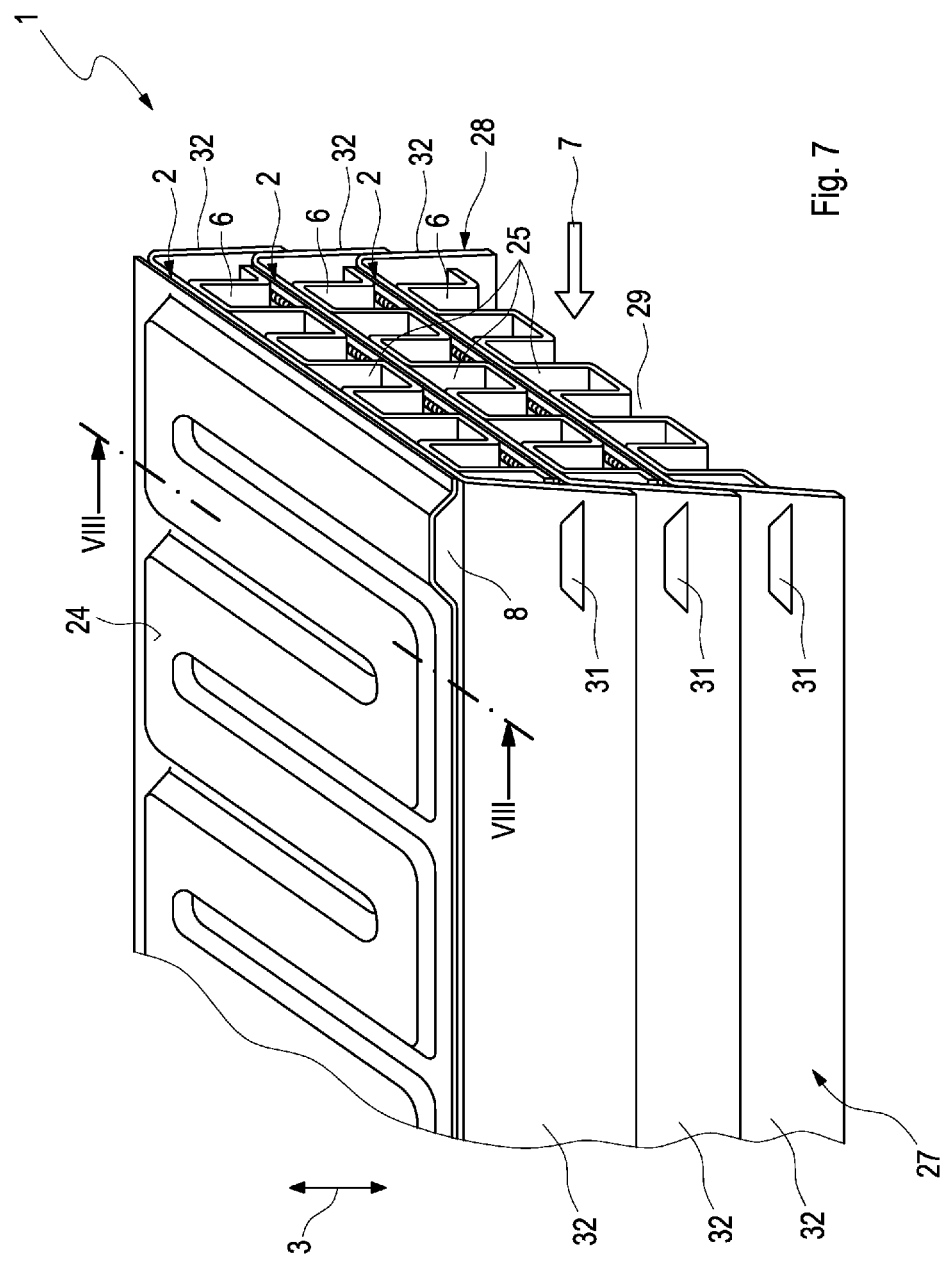
FIG. 7 is an isometric view of a region of the evaporator.
Figure 8:
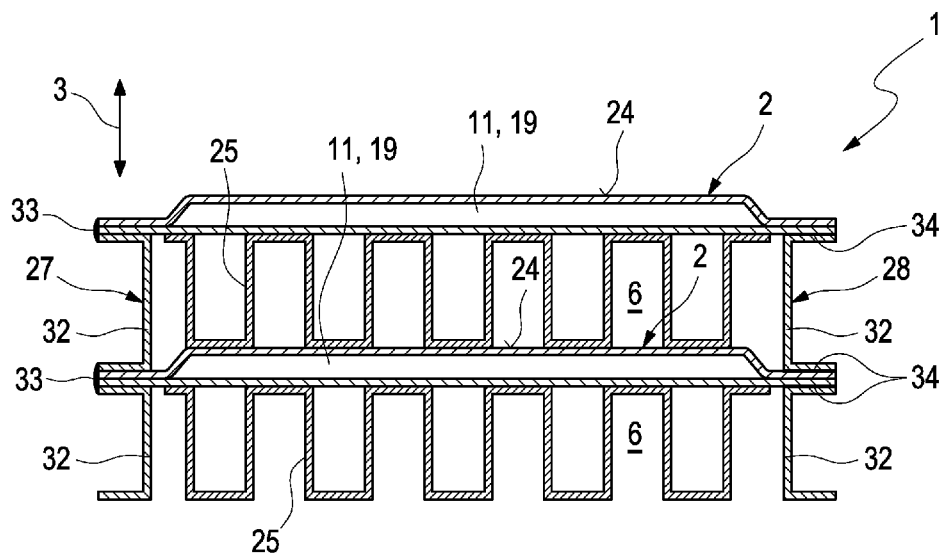
FIG. 8 is a sectional view through a region of the evaporator according to section lines VIII in FIG. 7, showing one of different embodiments.
Figure 9:
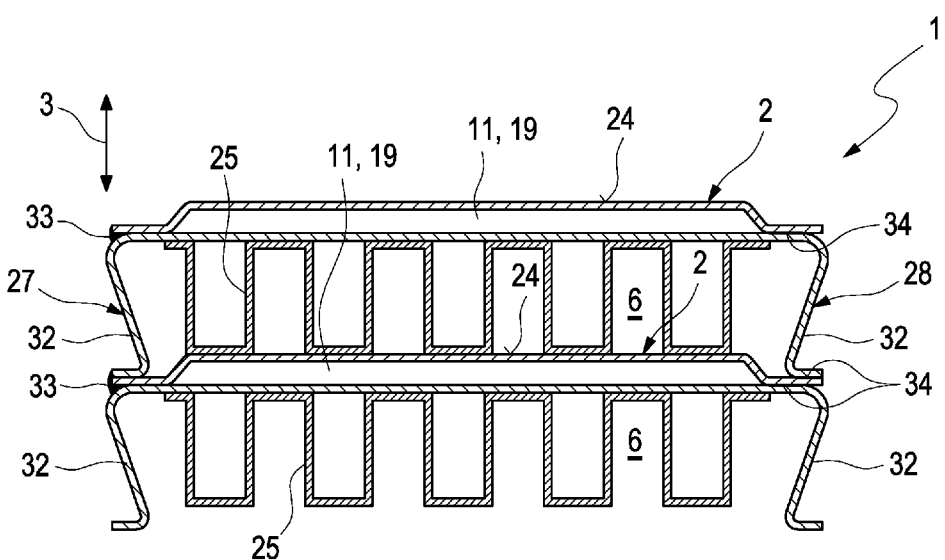
FIG. 9 is a sectional view through a region of the evaporator according to section lines VIII in FIG. 7, showing another of different embodiments.
Figure 10:
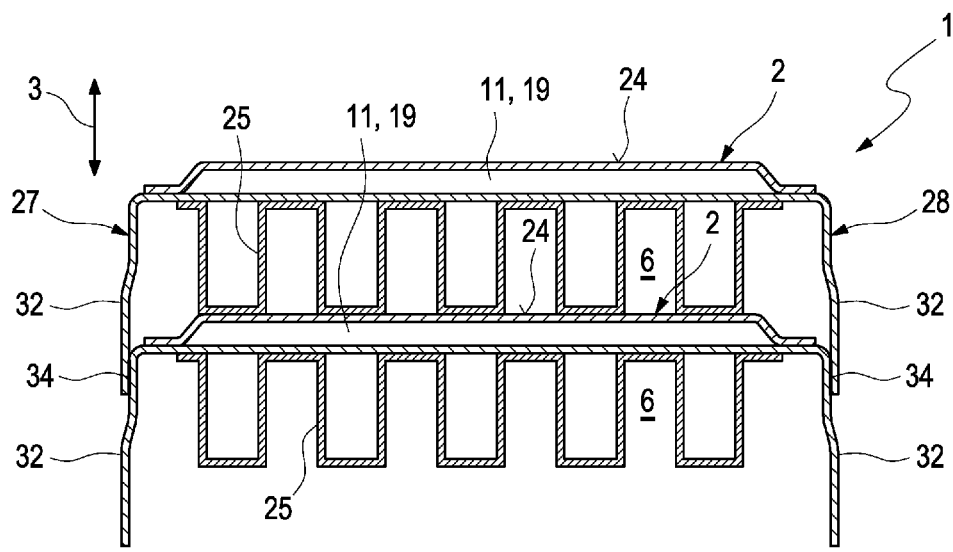
FIG. 10 is a sectional view through a region of the evaporator according to section lines VIII in FIG. 7, showing another of different embodiments.
Figure 11:
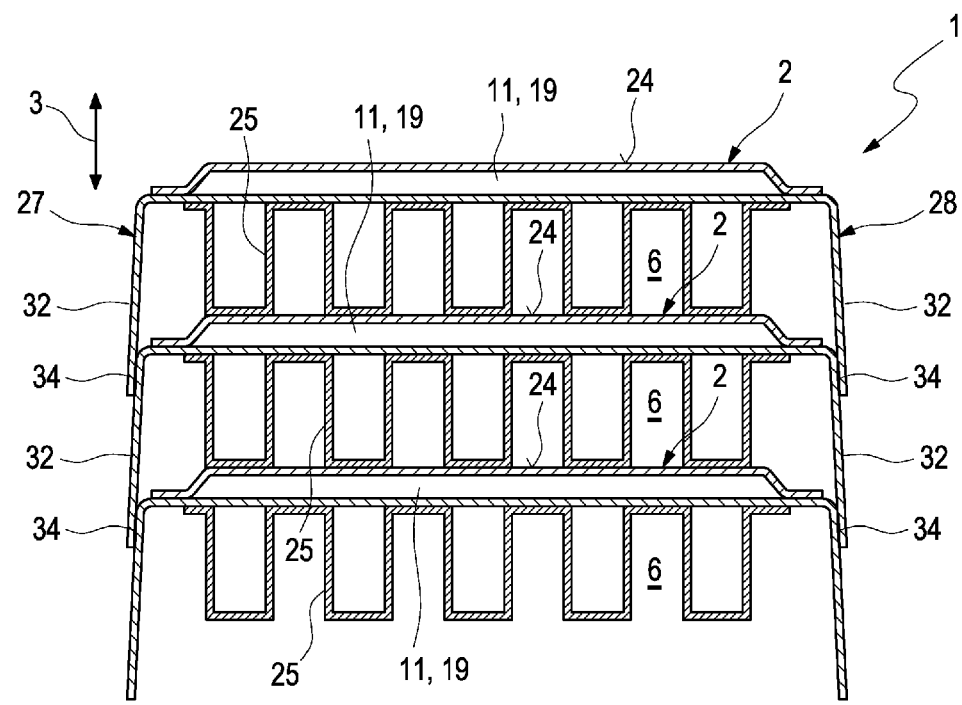
FIG. 11 is a sectional view through a region of the evaporator according to section lines VIII in FIG. 7, showing another of different embodiments.
Figure 12:
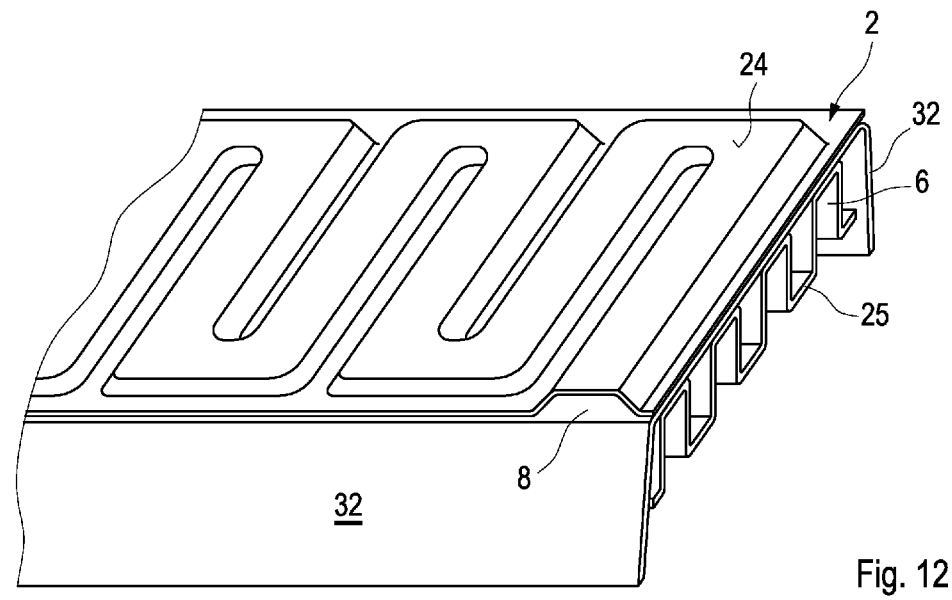
FIG. 12 is an isometric part view of a channel plate arrangement with fin structure.
Figure 13:
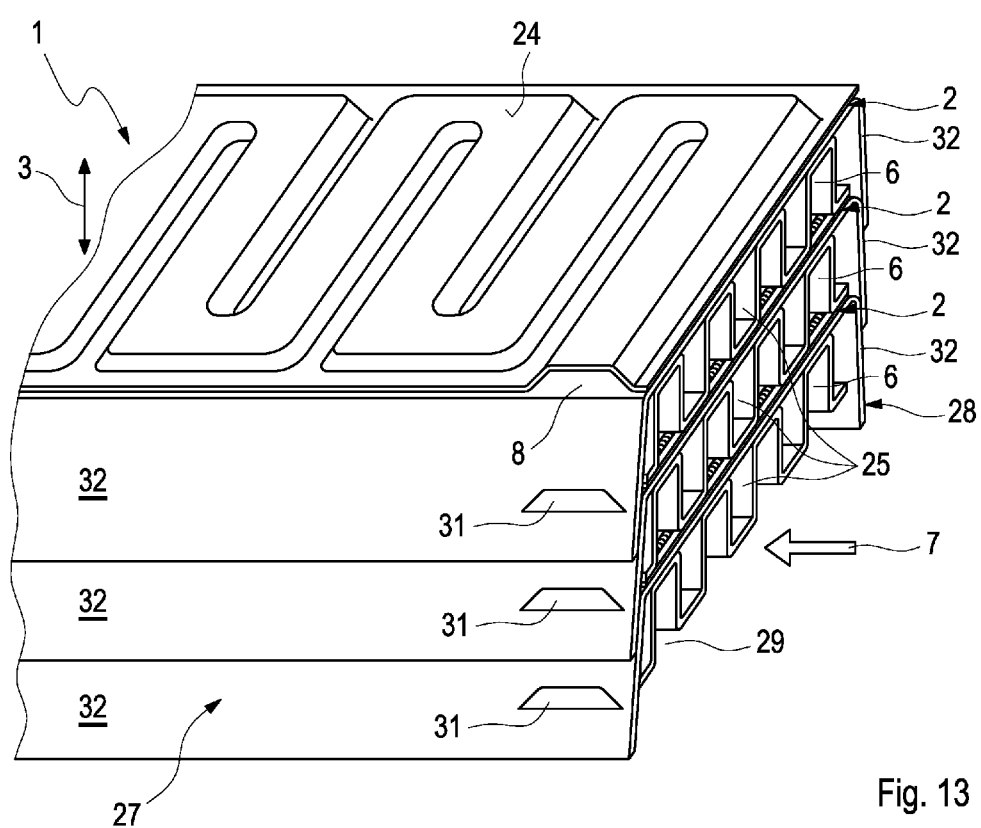
FIG. 13 is an isometric part view of the evaporator, showing one of different embodiments.

According to FIG. 1, an evaporator 1 comprises multiple channel plate arrangements 2, which are stacked in a stacking direction 3. The evaporator 1 serves for evaporating a liquid 4, which can be supplied to the evaporator 1 according to an arrow. Preferably, the evaporator 1 is employed in a waste heat utilization device of an internal combustion engine in order to extract heat from exhaust gases of the internal combustion engine in order to thereby evaporator a liquid, namely a working medium of the waste heat utilization device. Such a waste heat utilization device operates according to the Rankine cycle process or according to the Rankine-Clausius cycle process. A substantial component of such a waste heat utilization device is the evaporator 1, which creates a heat-transferring coupling between an exhaust system of the internal combustion engine and a waste heat utilization circuit of the waste heat utilization device. An example of such a waste heat utilization device is explained in more detail with reference to FIG. 15 further down below.

The stacked channel plate arrangements 2 form a plate stack 5 or evaporator lock 5. Within the stack 2 or within the block 5, a gas path 6 is formed in each case between two adjacent channel plate arrangements 2, through which a gas 7 can be conducted corresponding to arrows. By way of this gas 7, the heat required for evaporating the liquid 4 is supplied. The gas 7 in particular is exhaust gas of an internal combustion engine, the waste heat of which is to be utilized for example in a waste heat utilization device.

According to FIG. 2, each channel plate arrangement 2 comprises a liquid inlet 8 and a vapor outlet 9, through which vapor 10 or evaporated liquid can exit. Furthermore, the respective channel plate arrangement 2 comprises a channel 11, which fluidically connects the liquid inlet 8 to the vapor outlet 9. The channel 11 in this case forms a repeatedly diverted evaporation path 12 represented in dashed line for the liquid 4 to be evaporated. In the flow direction of the liquid 4 to be evaporated, the channel 12 initially comprises a preheating zone 13, which is followed by an evaporation zone 14, which is followed by a superheating zone 15. Here, the preheating zone 13 substantially extends from the liquid inlet 8 as far as to a region 16 of the evaporation path 12, in which evaporation of the liquid 4 commences. Within the preheating zone 13, the liquid 4 is thus heated to its boiling temperature. The evaporation zone 14 substantially extends from this region 16, in which evaporation of the liquid 4 commences, as far as to a region 17 of the evaporation path, in which the liquid 4 is substantially evaporated completely. Within the evaporation zone 14, the liquid 4 substantially remains at its boiling temperature and is completely evaporated within the evaporation zone 14. The superheating zone 15 substantially extends from the region 17, in which the liquid 4 is substantially evaporated completely, as far as to the vapor outlet 9. Within the superheating zone 15, the temperature of the vapor 9 increases beyond the boiling temperature of the liquid 4.

The evaporator 1 introduced here is now characterized that within the respective channel plate arrangement 2 the respective channel 11 has a cross section 18 through which a flow can flow which at least in the evaporation zone 14 increases in the flow direction of the evaporating liquid 4. In the shown embodiment of FIG. 2, the cross section 18 through which a flow can flow abruptly increases in multiple steps. In another embodiment, an increase of the cross section 18 that can be subjected to a through-flow can also be realized without steps or continuously.

In the embodiment shown in FIG. 2, the cross section 18 through which a flow can flow is kept constant within the preheating zone 13.d. Furthermore, in the embodiment shown in FIG. 2, the cross section 18 through which a flow can flow is kept constant within the superheating zone 15. Thus, an increase of the cross section 18 in this case takes place only within the evaporation zone 14. The cross section 18 through which a flow can flow is consequently smaller in the preheating zone 13 than in the superheating zone 15.

Practically, the respective channel 11 is configured meander-like in order to realize the repeatedly diverted evaporation path 12 in as compact as possible a manner. According to FIG. 2, the respective channel 11 for this purpose can be formed through multiple channel sections 19 which are arranged next to one another and separated from one another through joint channel walls 43, which channel sections 19 are arranged on one another 19, so that the evaporation path 12 at the transition between two adjacent channel sections 19 is subjected to a 180° diversion in each case. For example, the liquid 4 or the vapor 10 flows through the individual channel sections 19 starting out from the liquid inlet 4 as far as to the vapor outlet 9 alternately from the bottom up or from the top down.

According to the FIGS. 3-14, the respective channel plate arrangement 2 can each comprise plates 20, 21, wherein the respective channel 11 and the channel sections 19 are formed through stampings 22. These stampings 22 can be formed in both plates 20, 21 mirror-symmetrically according to FIG. 3 or be formed in only one of the plates 20, 21 according to FIG. 4. In the example of FIG. 4, the one plate 20 is furnished with the stampings 22 while the other plate 21 is configured flat.

The two plates 20, 21, which between them form the channel 11 and the channel sections 19 respectively, are practically fixed to one another. Corresponding fastening locations are marked 23 in the FIGS. 3 and 4. These fastening locations 23 can be soldered connections or welded connections. The fastening locations 23 are practically embodied tight and are realized so that they laterally enclose the respective channel 11 and the respective channel section 19 and in particular form the channel walls 43, so that ultimately the two plates 20, 21 are fastened to one another along the evaporation path 12.

The plates 20, 21 provided with the stampings 22 can be, on their outside, which within the block 5 faces the gas path 6, be convexly curved or according to the FIGS. 6-14 be configured flat in the regions of the stampings 22 according to the FIGS. 3-5. In the case of curved stampings 22, curved contact surfaces 24 are created. Accordingly, in the case of the flat stampings 22, flat contact surfaces 24 are created.

According to the FIGS. 1, 5 and 7-14, a fin structure 25 can be arranged within the respective gas path 6 in order to improve the heat transfer from the gas flow 7 to the channel plate arrangements 2 and thus to the liquid 4 to be evaporated. The respective fin structure 25 in this case contacts the respective plate 20, 21 of the respective channel plate arrangement 2 facing the gas path. Practically, this contacting takes place in the previously mentioned contact surfaces 24. Advantageously, according to FIG. 5, fixing of the fin structure 5 to the channel plate arrangements 2 in the region of the contact surfaces 24 can be additionally realized. Corresponding fastening locations are marked 26 in FIG. 5. Again, these can be soldering locations or welding locations.

In order to improve the connection of the fin structure 25 to the channel plate arrangement 2, the flat contact surfaces 24 are preferred. In particular, the fin structures 25 for this purpose can comprise a rectangular profile of a diamond profile transversely to the gas path 6 according to the FIGS. 7-14 and accordingly likewise have flat contact surfaces, which are really in contact with the contact surfaces 24 of the channel plate arrangements 2.

According to the FIGS. 1 and 7-14, the evaporator 1 comprises two lateral boundary walls 27, 28, which limit the gas paths 6 on sides located opposite one another and thereby extend from a gas inlet 29 as far as to a gas outlet 30. According to the FIGS. 7 and 13, the respective boundary wall 27 facing the beholder can comprise inlet openings 31, which are each fluidically connected to a liquid inlet 8 of the respective channel plate arrangement 2. The respective boundary wall 28 located opposite accordingly contains outlet openings which are not noticeable here, each of which is fluidically connected to a vapor outlet 9 of the respective channel plate arrangement 2.

In the embodiments of the FIGS. 7-14 shown here, the two boundary walls 27, 28 are each formed through multiple wall elements 32, wherein the individual wall elements 32 each laterally limit only one of the gas paths 6. In the embodiment shown in FIG. 8, these wall elements 32 are designed as separate components with respect to the channel plate arrangements 2, which are attached to the channel plate arrangement 2 limiting the respective gas path 6. In contrast with this, the wall elements 32, with the embodiments of FIGS. 7 and 9-14, are integrally formed on one of the plates 20, 21 and attached to the adjacent channel plate arrangement 2. Assembly in each of these cases is again effected via various fastening points 33 or 34, which can be designed as soldered connections or welded connections. Purely exemplarily, multiple fastening points 33 are designed as multi-sheet seams, e.g. as three-sheet seams or four-sheet seams, while multiple other fastening locations 34 are designed as areal soldered connections. In the embodiments of the FIGS. 1 and 9-14, the respective wall element 32 is integrally formed on the respective plate 21, which is designed flat here and has no stampings 22. In principle, however, any other embodiment is also conceivable. For example, two stamped plates 20, 21 can be provided. Alternatively, the wall elements 32 can be integrally formed on the plate 20 provided with the stampings 22.

Figure 14:
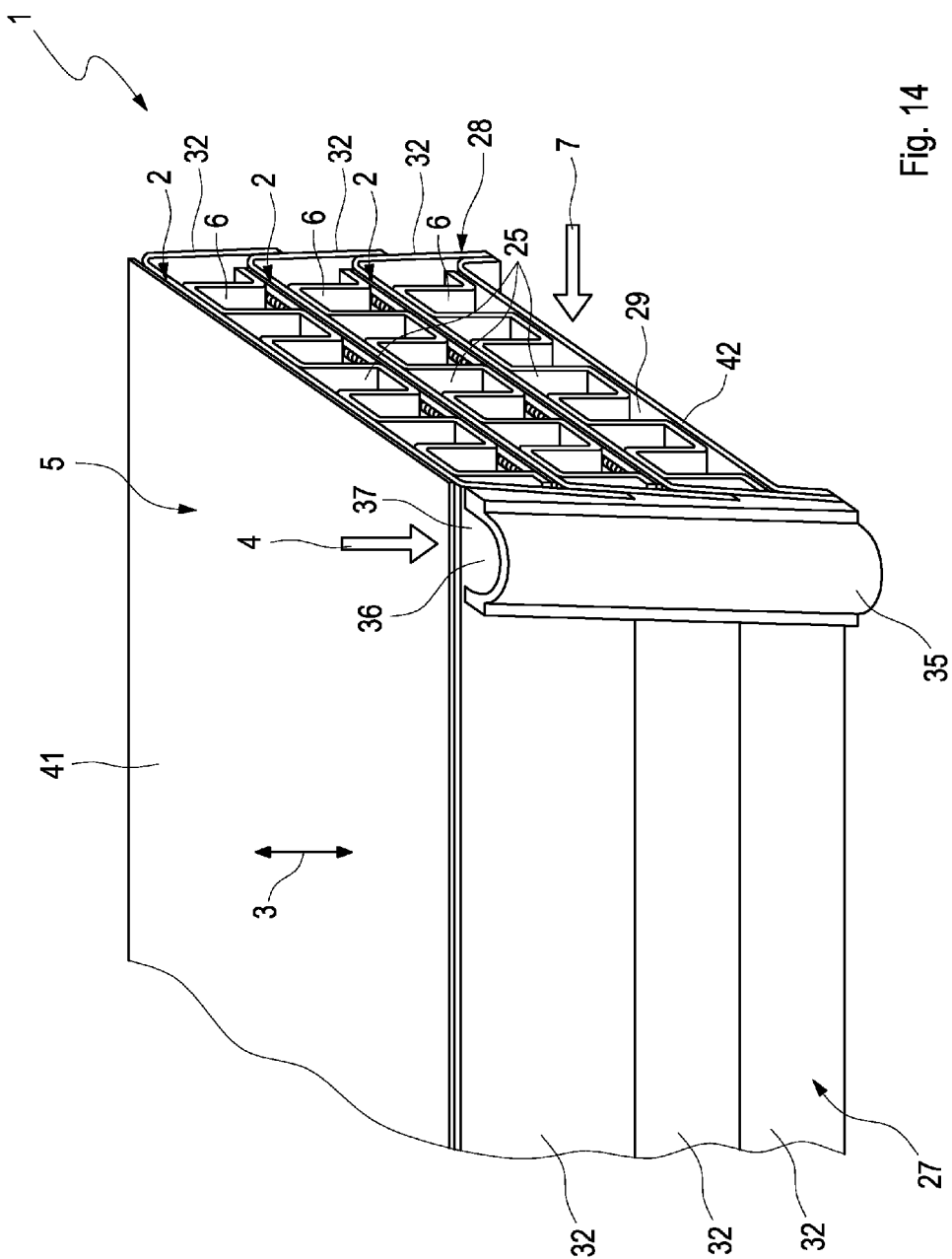
FIG. 14 is an isometric part view of the evaporator, showing another of different embodiments.

In the embodiment shown in FIG. 14, an inlet covering 35 is attached to the boundary wall 27 facing the beholder, which covers multiple or preferentially all inlet openings 31 of the respective boundary wall 27 and forms a supply channel 36, which fluidically connects a common liquid connection 37 to the liquid inlets 8 of the various channel plate arrangements 2. Analogously to this, the other boundary wall 28, according to FIG. 1, can also be equipped with an outlet covering 38 which covers multiple or preferentially all outlet openings of the respective boundary wall 28 on the outlet side and in the process forms a discharge channel 39, which fluidically connects a common vapor connection 40 to the vapor outlets 9 of the respective channel plate arrangements 2.

As is evident furthermore from FIG. 14, the stack 5 or the block 5 respectively each comprise an end plate 41 and 42 respectively on ends which with respect to the stack direction 3 are distant from one another. The respective end plate 41, 42 limits in each case a gas path 6 in the stack direction 3 together with a channel plate arrangement 2 which is adjacent thereto. In said gas path 6, a fin structure 25 can be additionally arranged. In the example of FIG. 14, the upper end plate 41 can be additionally formed integrally with two wall elements 32, which jointly with the wall elements 32 of the channel plate arrangements 2 form the two boundary walls 27, 28.

The lower end plate 42 shown in FIG. 14 is laterally overlapped by the wall elements 32 of the channel plate arrangement 2 adjacent thereto, as a result of which a sealed termination for the stack 5 or the block 5 can be easily realized.

Figure 15:
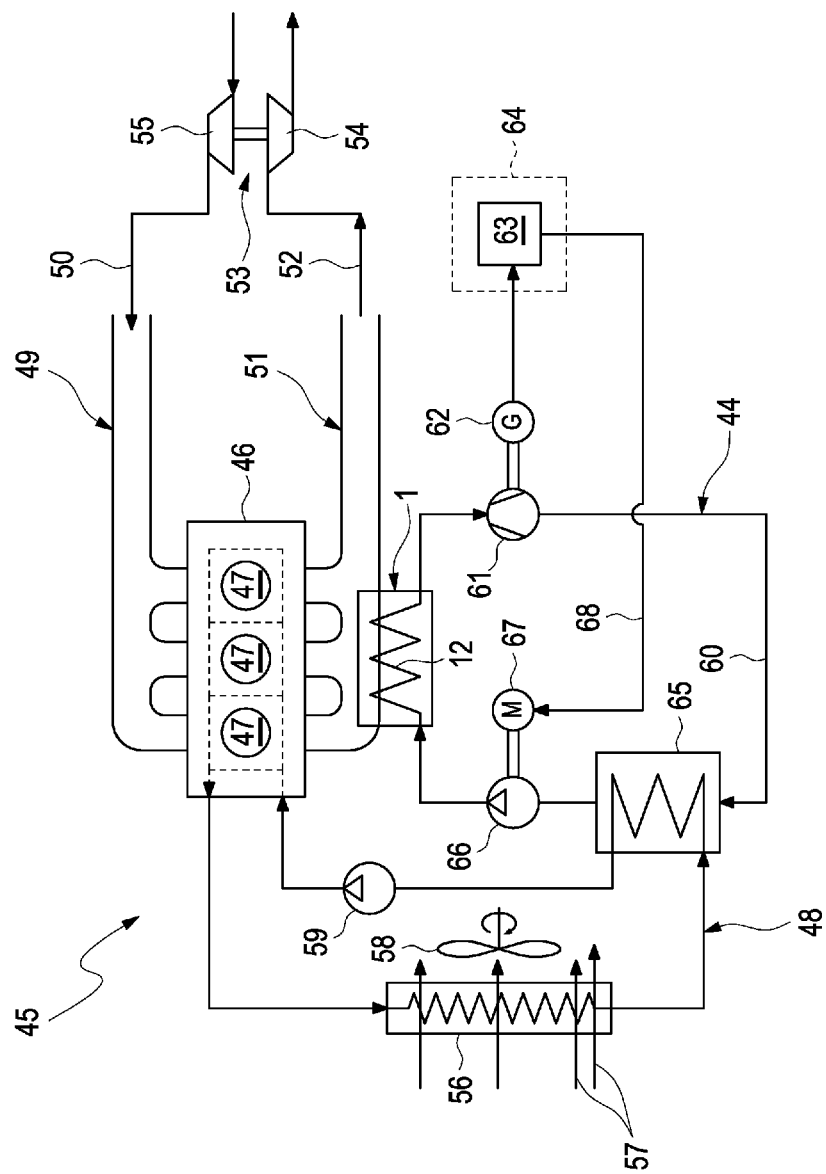
FIG. 15 is a highly simplified schematic representation in the manner of a circuit diagram of a waste heat utilization device with such an evaporator.

According to FIG. 15, an evaporator 1 according to the embodiments described above can be integrated in a waste heat utilization device 44, with the help of which in an internal combustion engine 45, heat contained in the exhaust gas can be utilized in order to thus improve the energetic efficiency of the internal combustion engine 45. According to FIG. 15, such an internal combustion engine 45 comprises in the usual manner an engine block 46 with multiple combustion chambers 47 and a cooling block 48 for cooling the engine block 46. The internal combustion engine 45 additionally comprises a fresh air system 49 for supplying fresh air to the combustion chambers 47. A corresponding fresh air flow is indicated in FIG. 15 by an arrow and marked with 50. Furthermore, an exhaust system 51 is provided, which discharges exhaust gas from the combustion chambers 47. A corresponding exhaust gas flow is indicated in FIG. 15 by an arrow and marked with 52. In the example, the internal combustion engine 45 is equipped furthermore with an exhaust gas turbocharger 53, the turbine 54 of which is incorporated in the exhaust system 51 and the compressor 55 of which is incorporated in the fresh air system 49.

The cooling circuit 48 includes a radiator 56, which is exposed to an airflow 57 indicated by arrow, which is generated or can be supported with the help of a fan 58. A coolant pump 59 drives the liquid coolant in the cooling circuit 48.

The waste heat utilization device 44 comprises a waste heat utilization circuit 60, in which a working medium circulates. In the waste heat utilization circuit 60 the evaporator 1 is arranged in such a manner that the working medium follows the evaporation path 12. Downstream of the evaporator 1, an expansion machine 61 is arranged in the waste heat utilization circuit 60, which expands the compressed, evaporated and superheated working medium. In the process, the expansion machine converts heat or enthalpy into mechanical work and drives for example a generator 62 or G. The generator 62 in this case is electrically connected to an electrical energy storage unit 63, which for example belongs to an electrical system 64 of the internal combustion engine 45 or of a vehicle, in which the internal combustion engine 45 is arranged. Downstream of the expansion machine 61, a condenser 65 is arranged in the waste heat utilization circuit 60, in which the expanded working medium is condensed. For this purpose, the condenser 65 comprises a heat exchanger or is configured as such. The condenser 65 can be incorporated in a cooling in a suitable manner. In the example, the condenser 65 is incorporated in the cooling circuit 48 of the internal combustion engine 45 in order to extract the heat from the working medium. It is clear that in another embodiment a cooling circuit which with respect to the engine cooling circuit 48 is separate can also be provided for discharging the heat from the waste heat utilization circuit 60. Downstream of the condenser 65, the waste heat utilization circuit 60 comprises a conveying device 66, in particular a volumetric pump. The conveying device 66 serves for driving the working medium in the waste heat utilization circuit 60. Here, the conveying device 66 operates against a pressure that can be adjusted with the help of the expansion machine. For driving the conveying device 66, an electric motor 67 or M can be provided for example. The power supply of the electric motor 67 is practically effected with the help of the electrical system 64, for the purpose of which a suitable power supply line 68 can be provided.

While specific embodiments of the invention have been shown and described in detail to illustrate the application of the principles of the invention, it will be understood that the invention may be embodied otherwise without departing from such principles.

The invention claimed is:

1. An evaporator for evaporating a liquid for a waste heat utilization device of an internal combustion engine, the evaporator comprising:
multiple channel plate arrangements, which are stacked in a stacking direction, wherein in each case between two adjacent channel plate arrangements a gas path is formed, through which a gas can be conducted, via which the heat required for evaporating the liquid can be supplied, wherein:
each channel plate arrangement comprises a liquid inlet, a vapor outlet and a channel connecting the liquid inlet to the vapor outlet, which channel forms a repeatedly diverted evaporation path for the liquid to be evaporated;
each respective one of channel plate arrangements comprises two plates, wherein the channel is formed through stampings, the stampings being one of formed in only one of the two plates and formed in each of the two plates mirror-symmetrically;
two lateral boundary walls limit each gas path on sides located opposite one another from a gas inlet to a gas outlet of each gas path;
each of the boundary walls are formed through multiple wall elements, each of the multiple wall element laterally limiting one of the gas paths;
the wall elements are attached either to both channel plate arrangements limiting the gas path or in each case the walls elements are integrally formed on one of the plates of a channel plate arrangement limiting the gas path and are attached to the channel plate arrangement which is adjacent to the wall elements; and
the respective one of the channels comprises at least in one evaporation zone of the evaporation path with a cross section, through which a flow can flow, which increases in the flow direction of the evaporating liquid.

2. The evaporator according to claim 1, wherein the respective one of the channels in a preheating zone of the evaporation path has a cross section, through which the flow can flow, which remains constant in the flow direction of the liquid.

3. The evaporator according to claim 1, wherein the respective one of the channels in a superheating zone of the evaporation path has a cross section, through which the flow can flow, which remains constant in the flow direction of the evaporated liquid.

4. The evaporator according to claim 1, wherein the respective one of the channels in a preheating zone of the evaporation path has a smaller cross section through which the flow can flow than in a superheating zone of the evaporation path.

5. The evaporator according to claim 1, wherein the respective one of the channels channel is formed through multiple channel sections arranged next to one another, wherein the evaporation path at a transition between two channel sections has a 180° diversion each.

6. The evaporator according to claim 1, wherein the respective one of the plates provided with stampings comprises, on an outside facing the gas path, convexly curved or flat contact surfaces in the region of the stampings.

7. The evaporator according to claim 6, wherein in the respective one of the gas paths a fin structure is arranged, the fin structure being fastened to the contact surfaces.

8. The evaporator according to claim 1, wherein the two plates of the respective one of the channel plate arrangements are fastened to one another.

9. The evaporator according to claim 8, wherein the two plates of the respective one of the channel plate arrangements, laterally enclosing the respective one of the channels, are fastened to one another along the evaporation path.

10. The evaporator according to claim 1, wherein:
one of the boundary walls comprises inlet openings, which in each case are fluidically connected to a liquid inlet of one of the channel plate arrangements,
the one or another of the boundary walls comprises outlet openings, each of which is fluidically connected to a vapor outlet of one of the channel plate arrangements.

11. The evaporator according to claim 10, wherein on the one or the other boundary wall an outlet covering is attached, which covers multiple or all outlet openings and forms a discharge channel, which fluidically connects a common vapor connection to the vapor outlets.

12. The evaporator according to claim 1, wherein an inlet covering is attached on one of the boundary walls, the inlet covering covering multiple or all inlet openings and forms a supply channel, which fluidically connects a common liquid connection to the liquid inlets.

13. The evaporator according to claim 1, wherein the stacked channel plate arrangements form a stack which comprises two end plates which with respect to the stack direction are distant from one another, each of which together form with a channel plate arrangement adjacent thereto form a gas path.

14. The evaporator according to claim 1, wherein the respective one of the channel plate arrangements is formed of at least one of iron, an iron alloy, steel, stainless steel, a metal, a metal alloy, and an aluminum alloy.

15. The evaporator according to claim 1, wherein the two lateral boundary walls extend parallel to the gas path.

16. The evaporator according to claim 15, wherein each the two lateral boundary walls comprises an opening facing in a direction of the gas path.

17. A waste heat utilization device for an internal combustion engine, in a motor vehicle, the device comprising:
   a waste heat utilization circuit, in which a working medium circulates and comprising an expansion machine for expanding the working medium, a condenser for condensing the working medium, a conveying device for driving the working medium in the waste heat utilization circuit and an evaporator for evaporating the working medium the evaporator comprising:
   multiple channel plate arrangements, which are stacked in a stacking direction, wherein in each case between two adjacent channel plate arrangements a gas path is formed, through which a gas can be conducted, via which the heat required for evaporating the liquid can be supplied, wherein:
   each channel plate arrangement comprises a liquid inlet, a vapor outlet and a channel connecting the liquid inlet to the vapor outlet, which channel forms a repeatedly diverted evaporation path for the liquid to be evaporated;
   each respective channel plate arrangement comprises two plates, wherein the channel is formed through stampings, the stampings being one of formed in only one of the two plates and formed in each of the two plates mirror-symmetrically;
   two lateral boundary walls limit each gas path on sides located opposite one another from a gas inlet to a gas outlet of each gas path;
   each of the boundary walls are formed through multiple wall elements, each of the multiple wall element laterally limiting one of the gas paths;
   the wall elements are attached either to both channel plate arrangements limiting the gas path or in each case the walls elements are integrally formed on one of the plates of a channel plate arrangement limiting the gas path and are attached to the channel plate arrangement which is adjacent thereto; and
   the respective channel comprises at least in one evaporation zone of the evaporation path with a cross section, through which a flow can flow, which increases in the flow direction of the evaporating liquid.

18. A waste heat utilization device according to claim 17 in combination with an internal combustion engine and with an exhaust system coupled to the evaporator of the waste heat utilization device in a heat-transferring manner.

19. An evaporator for evaporating a liquid for a waste heat utilization device of an internal combustion engine, the evaporator comprising:
   multiple channel plate arrangements, the multiple channel plate arrangements being stacked in a stacking direction, wherein a gas path is formed each case between each two adjacent channel plate arrangements, wherein a gas travels along the gas path through which a gas can be conducted, wherein heat from the gas traveling along the gas path is transferred to the liquid for evaporating the liquid, wherein:
   each channel plate arrangement comprises two plates, the two plates defining a liquid inlet, a vapor outlet and a channel, the channel connecting the liquid inlet to the vapor outlet, the channel forming a repeatedly diverted evaporation path for the liquid to be evaporated, the channel being formed through stampings, the stampings being one of formed in only one of the two plates and formed in each of the two plates mirror-symmetrically;
   a first lateral boundary wall;
   a second lateral boundary located laterally opposite the first lateral boundary wall in a direction traversing a flow direction of the gas along the gas path, the first lateral boundary wall defining a portion of one side of the gas path and the second lateral boundary wall defining another portion of another side of the gas path, the first lateral boundary wall and the second boundary wall extending from a gas inlet of the gas path to a gas outlet of the gas path;
   each of the boundary walls are formed through multiple wall elements, each of the multiple wall element laterally defining at least a portion of one of the gas paths;
   the wall elements are attached either to both channel plate arrangements limiting the gas path or in each case the walls elements are integrally formed on one of the plates of a channel plate arrangement limiting the gas path and are attached to the channel plate arrangement which is adjacent thereto; and
   the respective one of the channels comprises at least in one evaporation zone of the evaporation path with a cross section, through which a flow can flow, which increases in the flow direction of the evaporating liquid.

20. An evaporator in accordance with claim 19, wherein one of the first boundary wall and the second boundary wall comprises inlet openings, each of the inlet openings being fluidically connected to a liquid inlet of one of the channel plate arrangements, another of one the first boundary wall and the second boundary wall comprising outlet openings, each of the outlet openings being fluidically connected to a vapor outlet of one of the channel plate arrangements each of the outlet openings and each of the inlet openings facing in the direction traversing the flow direction of the gas along the gas path.

* * * * *